United States Patent [19]

Zoor

[11] 4,401,247
[45] Aug. 30, 1983

[54] FASTENING DEVICE FOR SUPPORTING BRACKETS OR LUGGAGE RACKS FOR AUTOMOTIVE VEHICLES

[75] Inventor: Reinhold Zoor, Dachau, Fed. Rep. of Germany

[73] Assignee: Heinrich Wunder GmbH Co. KG, Dachau, Fed. Rep. of Germany

[21] Appl. No.: 243,930

[22] PCT Filed: Jun. 27, 1980

[86] PCT No.: PCT/DE80/00092
§ 371 Date: Feb. 25, 1981
§ 102(e) Date: Feb. 25, 1981

[87] PCT Pub. No.: WO81/00087
PCT Pub. Date: Jan. 22, 1981

[30] Foreign Application Priority Data
Jun. 27, 1979 [DE] Fed. Rep. of Germany ....... 2925994

[51] Int. Cl.³ ............................................. B60R 9/04
[52] U.S. Cl. ..................... 224/315; 70/232; 70/DIG. 56; 70/DIG. 57; 224/322; 224/331
[58] Field of Search ............... 224/315, 329, 330, 331, 224/322; 70/232, DIG. 57, 160, 162, 56, 58, DIG. 56

[56] References Cited
U.S. PATENT DOCUMENTS

| 2,171,664 | 9/1939 | McFarland | 70/DIG. 57 X |
| 3,109,569 | 11/1963 | Hare | 224/331 X |
| 3,131,985 | 5/1964 | Blonder | 70/DIG. 58 |
| 3,525,461 | 8/1970 | Bronson | 224/315 |
| 3,638,844 | 2/1972 | Bronson | 224/331 X |
| 3,660,996 | 5/1972 | Syvertson | 70/DIG. 58 X |
| 3,844,143 | 10/1974 | Hudson | 70/232 X |
| 3,917,136 | 11/1975 | Carson | 224/330 X |

FOREIGN PATENT DOCUMENTS

| 2619815 | 3/1978 | Fed. Rep. of Germany . |
| 7901495 | 1/1979 | Fed. Rep. of Germany . |
| 2395863 | 1/1979 | France . |
| 2437324 | 4/1980 | France . |
| 428463 | 7/1967 | Switzerland . |

Primary Examiner—Allan N. Shoap
Attorney, Agent, or Firm—Kontler, Grimes & Battersby

[57] ABSTRACT

In a fastening device for supporting brackets or luggage racks for automotive vehicles, the tensioning screw which biases the clamping claw against the supporting foot and the roof gutter is overlapped by a protecting cap which is non-separably connected with the clamping claw. The protecting cap has a mounting aperture through which the tensioning screw can be actuated with a tool. The mounting aperture can be closed by a locking device which can be actuated by a key and closes the mounting aperture only in the locking position.

6 Claims, 4 Drawing Figures

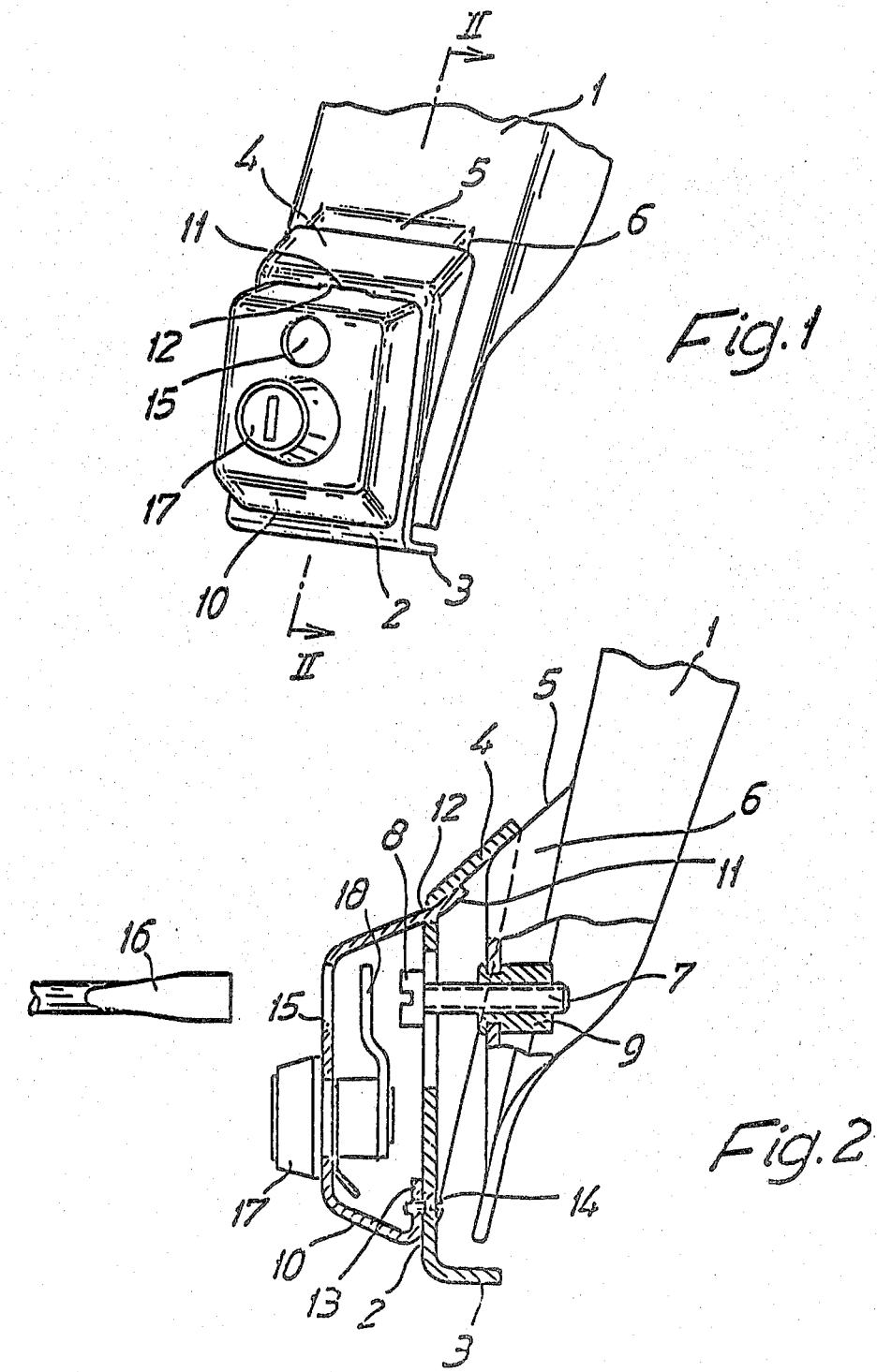

FASTENING DEVICE FOR SUPPORTING BRACKETS OR LUGGAGE RACKS FOR AUTOMOTIVE VEHICLES

BACKGROUND OF THE INVENTION

The invention relates to a fastening device of the type described in the preamble of claim 1.

In a conventional fastening device of this type (German Utility Model No. 78 07 135), a protecting cap is pivotably or removably secured to the clamping claw and is connectable with the clamping claw by the locking bolt of a lock secured to the protecting cap to the extent that, in the locking position of the lock, the locking bolt extends into a slot of the clamping claw so that, without actuating the lock, the protecting cap cannot be detached any more. In this manner, the tensioning screw which biases the clamping claw against the roof gutter and against the supporting foot is not accessible any more, i.e., the supporting foot can be secured to the roof gutter of an automative vehicle in a theftproof manner.

A drawback of this conventional construction is that, in order to allow for actuation of the tensioning screw, the protecting cap must be detached and then constitutes a part which is separated from the clamping claw and must be applied again subsequent to securing of the supporting bracket on the roof gutter. This is not only cumbersome but there also exists the possibility of the protecting cap becoming lost if it is not attached to the clamping claw when the supporting bracket is removed.

OBJECTS AND SUMMARY OF THE INVENTION

An object of the invention is to overcome such drawbacks and to provide a fastening device wherein the actuation is facilitated and losing of the protecting cap is impossible.

In accordance with the invention, this object is accomplished in that the protecting cap is non-separably connected with the clamping claw, at least from the outside, and is provided with a mounting aperture and in that the locking or blocking device closes the mounting aperture in the locking position thereof. As a result of connection of the protecting cap to the clamping claw in such a way that, at the very most, the protecting cap can be detached only from the inside, i.e., when the supporting bracket or the luggage rack is removed from the roof gutter, and further in view of the fact that a mounting aperture is provided in the protecting cap, one ensures that unlocking of the locking device merely entails exposure of the mounting aperture in order to be in a position to actuate the tensioning screw. Removal of the protecting cap is not necessary. This renders it impossible to misplace the protecting cap and to be incapable of locating it again, when necessary, while the supporting bracket or the luggage rack is removed.

In accordance with a preferred embodiment of the invention, the locking or blocking device comprises a lock which is disposed adjacent to the mounting aperture and has a portion, such as a locking bolt, which overlies the mounting opening from the inside in the locking position thereof.

The protecting cap can be welded or riveted to the clamping claw but it is also possible, in principle, to separably secure the protecting cap to the clamping claw. For such purpose, one end of the protecting cap comprises a bent-over tongue which can be introduced into a slot of the clamping claw and the opposite end of the protecting cap is provided with an inwardly bent portion or lug which is connectable with the clamping claw from the inner side of the latter by a screw connection. Owing to the last-discussed construction, there exists, broadly speaking, the possibility of separating the protecting cap from the clamping claw; however, only in the event that the supporting bracket or the luggage rack is not installed on the roof of the vehicle. In normal condition of use of the supporting bracket or luggage rack, the screw connection is covered by the clamping claw on the one hand and the supporting foot on the other hand so that the protecting cap cannot be removed.

In order to accomplish the previously mentioned object, the protecting cap, too, can be separably but articulately connected with a base plate or an analogous holder which can be fixed on the clamping claw by means of the tensioning screw, and the locking device can comprise a lock whose locking bolt cooperates with a recess or projection or the like on the base plate in the locking position of the bolt. In this embodiment, the protecting cap is again held against losing on the supporting bracket or on the luggage rack, as long as the tensioning screw meshes with the supporting foot. The base plate is held by the clamping claw even after the tensioning screw is loosened to such an extent that the clamping claw can be separated from the roof gutter or must be slipped onto it in order to be in a position to remove or detach the supporting bracket from the roof gutter. This embodiment of theft prevention of the supporting bracket can be installed subsequently at any time in an existing supporting bracket since there is no need to provide the clamping claw with any devices in order to be in a position to secure the protecting cap because the protecting cap is held on the clamping claw by the tensioning screw through the medium of the base plate which is articulately connected thereto. Subsequent equipping of a supporting bracket with such theft preventing device is rendered possible on the additional ground that the locking bolt does not cooperate with the clamping claw but rather with the base plate. Common to the two possible embodiments is the feature that, in both instances, the locking bolt does not cooperate with the clamping claw or with a part which is mounted on the clamping claw and constitutes a catch or a protuberance. Instead, in the first embodiment, the locking bolt overlaps the mounting aperture and, in the second embodiment, the locking bolt cooperates with the base plate so that the protecting cap and the base plate constitute a unit which is independent of the clamping claw.

BRIEF DESCRIPTION OF THE DRAWING

FIG. 1 is a perspective view of the lower part of a supporting foot of a supporting bracket or luggage rack with a fastening device which is secured against unauthorized opening;

FIG. 2 is a section along the line II—II in FIG. 1;

DESCRIPTION OF THE PREFERRED EMBODIMENTS

Figure 4:
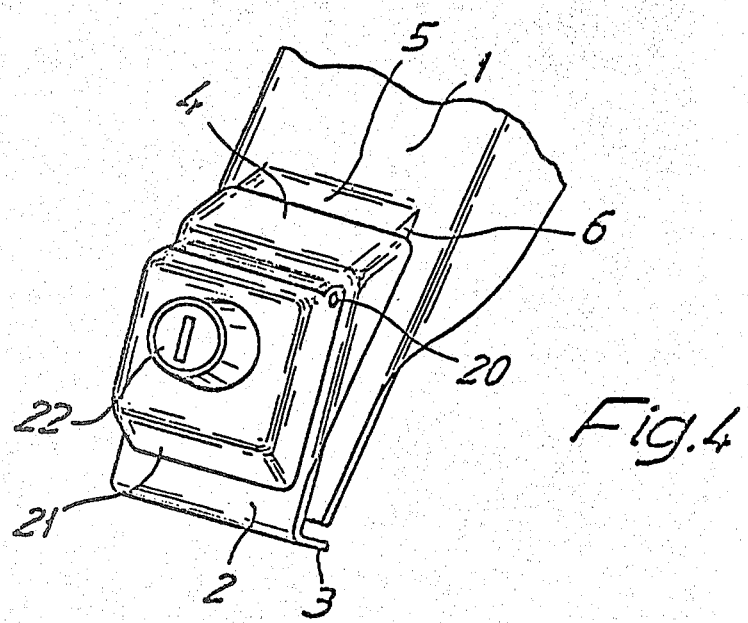
FIG. 4 is a perspective view of the modified embodiment shown in FIG. 3.

In each of the embodiments which are illustrated in the drawing, there is provided a clamping claw 2 which serves to secure a supporting member in the form of a foot on the roof gutter which is provided on an automotive vehicle and into which the supporting foot 1 extends. A hooked portion 3 of the clamping claw engages the roof gutter from below and its inclined upper part 4 rests on an inclined surface 5 which is formed by a protuberance 6 of the supporting foot 1. The clamping claw 2 can be biased against the supporting foot 1 by a securing device here shown as a tensioning screw 7. To this end, the tensioning screw 7 meshes with a nut 9 which is non-rotatably mounted in the interior of the protuberance 6 which latter is formed by a bulge of the supporting foot 1. A protecting cap 10 serves to cover the tensioning screw 7, especially its head 8 which is provided with a slot. The upper end of the protecting cap 10 has a bent-over tongue 11 which extends into a slot 12 of the clamping claw 2. At its lower end, the protecting cap 10 is provided with an inwardly bent portion or lug 13 which is connected by a fastener in the form of a screw 14 to the clamping claw 2 from the inner side of the latter. Consequently, when the clamping claw 2 is in a position of use, i.e., when the latter is mounted on the roof gutter and on the supporting foot 1, the protecting cap 10 cannot be removed anymore.

A mounting aperture 15 which is provided in the protecting cap allows for actuation of the tensioning screw 7, for example, with a screwdriver 16. A blocking device or lock 17 which is installed in the protecting cap 10 at a level below the mounting aperture 15 has a turnable locking portion or bolt 18 which overlies the mounting aperture 15 from the inside in the locking position thereof so that the screwdriver 16 cannot reach the tensioning screw 7 anymore.

Figure 3:
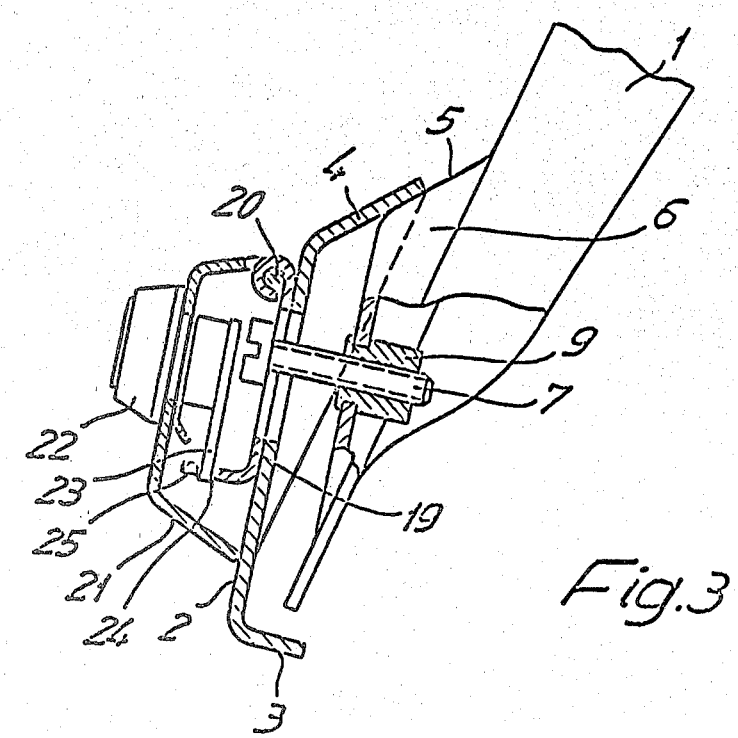
FIG. 3 is a sectional view of a modified embodiment.

In the embodiment of FIGS. 3 and 4, the tensioning screw 7 can secure the clamping claw 2 to a holder here shown as a base plate 19 to which is articulately connected a protecting cap 21 by way of a hinge 20. A lock 22 which is installed in the protecting cap 21 comprises a turnable locking bolt 23 which extends into the opening 24 of an extension 25 secured to the base plate 19 whereby the protecting cap 21 cannot be pivoted upwardly about the hinge 20. In such locking position of the lock 22, the tensioning screw 7 is protected against unauthorized access. Since it is entirely independent of the clamping claw 2, i.e., since there is not need to provide the claiming claw with slots or projections in order to secure the protecting cap, this embodiment can be mounted on a supporting bracket at a later time.

I claim:

1. In a luggage rack or an analogous carrier of objects on the roof of an automotive vehicle of the type having a roof gutter, the combination of at least one supporting member which can extend from above into the roof gutter of a vehicle; a claw which can overlie such roof gutter and engage the latter from below a device for releasably securing said claw to said supporting member and to the roof gutter of the vehicle on which the carrier is mounted; a protecting cap mounted on and located in front of said claw and having an aperture which renders the securing device accessible through said cap, said protecting cap being nonseparable from the claw from the outside thereof; and a blocking device provided on said cap and having a portion movable between first and second positions in which said portion respectively presents and affords access to said supporting member in said aperture.

2. The combination of claim 1, wherein said blocking device comprises a lock mounted on said cap adjacent to said aperture and said portion of said blocking device is a bolt which is located in the interior of said cap.

3. The combination of claim 2, wherein said bolt is turnable between said positions thereof.

4. The combination of claim 1, wherein said cap is welded to said claw.

5. The combination of claim 1, wherein said cap is riveted to said claw.

6. The combination of claim 1, wherein said cap has a first end portion including a tongue and an inwardly bent second end portion adjacent to said claw, said claw having a slot for said tongue and further comprising fastener means on said claw and separably securing said inwardly bent portion of said cap to said claw.

* * * * *